(12) United States Patent
Prestas et al.

(10) Patent No.: US 6,845,387 B1
(45) Date of Patent: Jan. 18, 2005

(54) CREATING VIRTUAL PRIVATE CONNECTIONS BETWEEN END POINTS ACROSS A SAN

(75) Inventors: Gregory Prestas, Ithaca, NY (US); Mark A. DeWilde, Freeville, NY (US); Jeffrey S. Goldner, Ithaca, NY (US); Terence M. Kelleher, Ithaca, NY (US); Said Rahmani Khezri, Ithaca, NY (US)

(73) Assignee: Advanced Digital Information Corporation, Redmond, WA (US)

( * ) Notice: Subject to any disclaimer, the term of this patent is extended or adjusted under 35 U.S.C. 154(b) by 0 days.

(21) Appl. No.: 09/545,436

(22) Filed: Apr. 7, 2000

(51) Int. Cl.[7] .................................. G06F 15/16
(52) U.S. Cl. ................ 709/203; 709/213; 709/219; 709/225; 370/360; 370/362; 370/395.53; 711/149; 711/150; 711/153; 713/168
(58) Field of Search ................ 370/360, 362, 370/363, 381, 382, 383, 395.53, 465, 466; 709/201, 203, 212, 213, 215, 216, 217, 219, 223, 225; 713/155, 168, 170, 200, 201, 202; 711/100, 111, 112, 113, 114, 147, 149, 150, 152, 153

(56) References Cited

U.S. PATENT DOCUMENTS

| | | | |
|---|---|---|---|
| 5,613,141 A | 3/1997 | Szatkowski et al. | |
| 5,802,366 A | 9/1998 | Row et al. | |
| 5,862,404 A | 1/1999 | Onaga | |
| 5,941,972 A | 8/1999 | Hoese et al. | |
| 6,185,601 B1 * | 2/2001 | Wolff | 709/203 |
| 6,493,825 B1 * | 12/2002 | Blumenau et al. | 713/168 |

* cited by examiner

Primary Examiner—Huy D. Vu
Assistant Examiner—Thomas E. Volper
(74) Attorney, Agent, or Firm—Perkins Coie LLP (57) ABSTRACT

There is disclosed a method and architecture for establishing independent, secure, trusted sub-networks within a storage area network (SAN). These virtual private SANs allow secure, managed interconnections between an initiator host and a target storage device or a logical unit number (LUN) indicating a sub-portion of a target storage device. A table of allowable configurations along with a connections database are used to ensure proper, allowable data connections.

26 Claims, 9 Drawing Sheets

CREATING VIRTUAL PRIVATE CONNECTIONS BETWEEN END POINTS ACROSS A SAN

FIELD OF THE INVENTION

The present invention relates to storage area networks (SANs) and, more particularly, to a method and architecture for establishing virtual, private storage area sub-networks within storage area networks.

BACKGROUND OF THE INVENTION

According to the Storage Network Industry Association (SNIA), A Storage Area Network (SAN) is a network whose primary purpose is the transfer of data between computer systems and storage elements and among storage elements. A SAN consists of a communication infrastructure, which provides physical connections, and a management layer, which organizes the connections, storage elements, and computer systems so that data transfer is secure and robust.

A SAN consists of computer systems (i.e., hosts or initiators) and storage devices, usually referred to simply as devices. Because every initiator on the SAN may have access to any device physically connected to the SAN, it becomes necessary to both control and secure the access of each host initiator to the target devices. An example of this is switch zoning which is used to limit the set of physically connected devices an initiator may see.

Fibre Channel zoning utilizes Fibre Channel switches having ports that allow hosts and devices to be interconnected. These switch ports can be configured into zones. A zone is essentially a list of which ports are connected to which other ports. With a switch having 12 ports, for example, one can configure a single, 12-port network, six two-port networks, or any other combination of exclusive and/or shared access networks. Because each interface connected to a shared port can see every device connected to the other shared ports, connections cannot be restricted at the level of an individual initiator or target device. Soft zoning is available on some switches, which controls access to individual targets on the basis of the unique worldwide port name that is part of the Fibre Channel protocol. Still, there is no ability to control connections to logical units within a target device.

Because many of today's devices may present themselves as multiple individual logical units, it becomes desirable to deliver these controls on the basis of individual Logical Unit Numbers (LUNs) and not simply at the level of a single physical target device. This is generally accomplished in one of three ways: Manual Configuration; Distributed Software Applications; and Target Device Access Controls.

Manual host configuration depends on the configuration abilities of the host platforms to control access at the level of individual logical units. In order to configure access for the SAN, the administrator must manually configure each system on the SAN. The administrator must maintain his own access maps, and must access each host individually to verify, change, and maintain the configuration. This approach cannot be considered to be trusted or secure because someone with access to and knowledge of an individual host system can remove or reconfigure the access restrictions for that host, thus violating the security of the network. Some operating systems provide LUN level configuration by default; others require the development and installation of special drivers. An example of the manual configuration type of access control is found in the Solaris™ operating system by Sun Microsystems. Solaris™ uses manually edited configuration files to control which devices and LUNs to which a host is allowed to connect. Another example can be found in the Windows 95/98, NT, and Solaris™ SSA driver and adapter products shipped by the assignee of the instant invention as early as 1995. A further example is referred to as LUN masking and is found in some of the currently shipping FC Adapters and drivers by JNI and Emmulex.

Distributed software application configuration is similar to the manual approach, the major difference being that platform specific agents or services, running under the direction of a central application, perform required low-level configuration tasks. The advantage of this approach over manual configuration is that an administrator now has the ability to perform SAN configuration tasks from one physical location, using one software application package. Host and adapter specific behavior is encapsulated in the application and its agents.

Systems of this type require the development of host and driver specific software for each supported platform and interface. Software development of this nature involves a high degree of specialized knowledge about each platform and driver. Furthermore, because this approach is tightly coupled with host drivers, ongoing maintenance effort may be high. Device drivers often go through intensive testing before they are released. Similarly, an application which is driver dependent may require extensive testing before it can be released into the field as a reliable product. Another drawback to this approach is that adding access checking to the drivers may result in decreased performance due to the need for the driver to do additional work for each command processed. Also, because solutions of this nature still rely upon the correct software and configuration to be installed on each host system, they can be easily circumvented and do not provide the level of host independent trusted access security that is needed.

Target device access controls provide most sophisticated degree of control found in the access control methods of the prior art. For example, most advanced RAID controllers present themselves as multi-LUN devices containing multiple volumes, providing the ability to map these logical devices onto their physical host interconnections. The limitations to this method are similar to those of the manual host configuration method. Specifically, this capability must be separately supported for each type of target device and must include a target-specific control application. As with the two access control methods previously described, the administrator must manually configure each individual device to create the overall SAN. As with manual host configuration, the next step along this path is the development of a distributed application with the ability to interact with the access controls of the target devices to allow administration to be performed from a central location.

None of these three methods provides a satisfactory means for creating trusted, secure, reliable sub-networks (virtual private SANs) within a SAN. The inventive method and architecture provides an architecture and method which overcome each of the limitations found in prior art methods.

DISCUSSION OF RELATED ART

In U.S. Pat. No. 5,613,141 for DATA STORAGE SUBSYSTEM HAVING DEDICATED LINKS CONNECTING A HOST ADAPTER, CONTROLLER AND DIRECT ACCESS STORAGE DEVICES, issued Mar. 18, 1997 to Michael J. Szatkowski, teaches an intelligent disk controller using multiple serial links carrying data and commands in packets to and from host adapters. Multiple serial links also carry data and commands in packets to and from storage devices. The controller contains data buffers and DMA channels to handle data input and output. The inventive VPS architecture, on the other hand, uses no data storage subsystems. In addition, sophisticated connection control between host initiators and target storage devices are disclosed. This allows secure, rapid connection between specific host initiators and target storage devices.

U.S. Pat. No. 5,802,366 for PARALLEL I/O NETWORK FILE SERVER ARCHITECTURE, issued Sep. 1, 1998 to Edward John Row, et al., teaches a file server architecture comprising a network control unit, a separate file controller unit, and a storage processor unit. These units incorporate their own processors and operate in parallel with a local units host processor. All network components are connected to the network controller which performs all protocol processing up to the NFS layer. The Row, et al. system architecture operates specifically with UNIX and NFS operating systems and is strictly a file server. The inventive architecture, on the other hand, implements management functions far more sophisticated than those taught by Row, et al. For example, the virtual connection cache memory allows very rapid establishment of connections between host initiators and target storage devices whereby total end-to-end management of a secure connection is guaranteed.

U.S. Pat. No. 5,862,404 for NETWORK DEVICE DISCOVERY AND STATUS INFORMATION DISTRIBUTION USING INDEPENDENT INFORMATION DISTRIBUTION PROCESSES, issued Jan. 19, 1999 to Tyson N. Onaga, teaches management server architecture for networked devices. In the Onaga system, intelligent peripheral devices create or update files containing their current status on a file server accessible from all network work stations. Attached work stations may then request this information from the file server rather than by polling the intelligent devices directly. The VPS architecture of the present invention, on the other hand, does not centralize data in this way but rather utilizes a virtual connection cache to ensure extremely fast establishment of connections between a host initiator and a target storage device.

Because some emerging present generation devices such as the Pathlight SAN Gateway and SAN Router can now parse the upper level protocol, it becomes possible to describe virtual networks as a list of virtual private connections between a host initiator interface and a specific logical and/or physical target device. A virtual private connection does not depend upon the physical network topography for its definition.

It is, therefore, an object of the invention to provide a virtual private SAN (VPS) wherein multiple virtual storage networks may co-exist over a physical SAN.

It is another object of the invention to provide a VPS which enables multiple hosts to share a single channel to a shared storage device, while protecting the security of each host's end-to-end access.

It is an additional object of the invention to provide a VPS which is completely host-independent; requires no additional software, middleware, driver, OS or other modifications anywhere within the SAN; and therefore provides a level of security that is independent of the security of the individual hosts.

It is still a further object of the invention to provide a VPS which is also completely independent of connected storage elements and requires no changes to legacy or new storage devices.

It is yet another object of the invention to provide a VPS which is free of interface dependencies and provides direct support for Fibre Channel, SCSI, and other SAN interfaces.

It is still a further object of the invention to provide a VPS which supports all classes of SAN connectivity products, including hubs and switches.

It is another object of the invention to provide a VPS including an optional, platform specific registration service that is able to collect and transmit the host and initiator specific information necessary to provide extra functionality, including automatic host initiator interface identification and configuration.

It is yet another object of the invention to provide a VPS that includes an automatic health monitoring feature that automatically keeps track of the dynamic health status of each host initiator connected to the SAN.

It is still another object of the invention to provide a VPS that utilizes the caching of virtual connection objects to enforce access controls without incurring the performance penalties inherent in repetitive database accesses.

It is a still further object of the invention to provide a VPS that has the ability to automatically capture an existing, configuration, as manifest in the connection cache at the time, and use it to configure persistent access controls automatically.

It is an additional object of the invention to provide a VPS platform wherein any device or group of interconnected devices, such as the Pathlight SAN GATEWAY and the Pathlight SAN ROUTER products that implement VPS technology of the invention, operate together seamlessly.

SUMMARY OF THE INVENTION

In accordance with the present invention there is provided a method and architecture for establishing independent, secure, trusted sub-networks within a storage area network (SAN). These virtual, private SANs (VPS) allow secure, managed interconnections between an initiator host and a target storage device or a logical unit sub-portion of a target storage device. A table of allowable configurations along with a connection database are used to ensure that proper, allowable data connections are established.

BRIEF DESCRIPTION OF THE DRAWINGS

A complete understanding of the present invention may be obtained by reference to the accompanying drawings, when considered in conjunction with the subsequent detailed description, in which.

For purposes of both clarity and brevity, like elements and components will bear the same designations and numbering throughout the FIGURES.

DESCRIPTION OF THE PREFERRED EMBODIMENT

Generally speaking, the invention features an architecture and method for interconnecting multiple host computer systems to multiple storage devices in a storage area network (SAN) and, more specifically, to the configuration and implementation of secure, reliable sub-networks (i.e., virtual private SANs) within the SAN. The virtual private SAN (VPS) is the implementation and administration of multiple physical interconnections between host initiators and storage devices.

Figure 1:
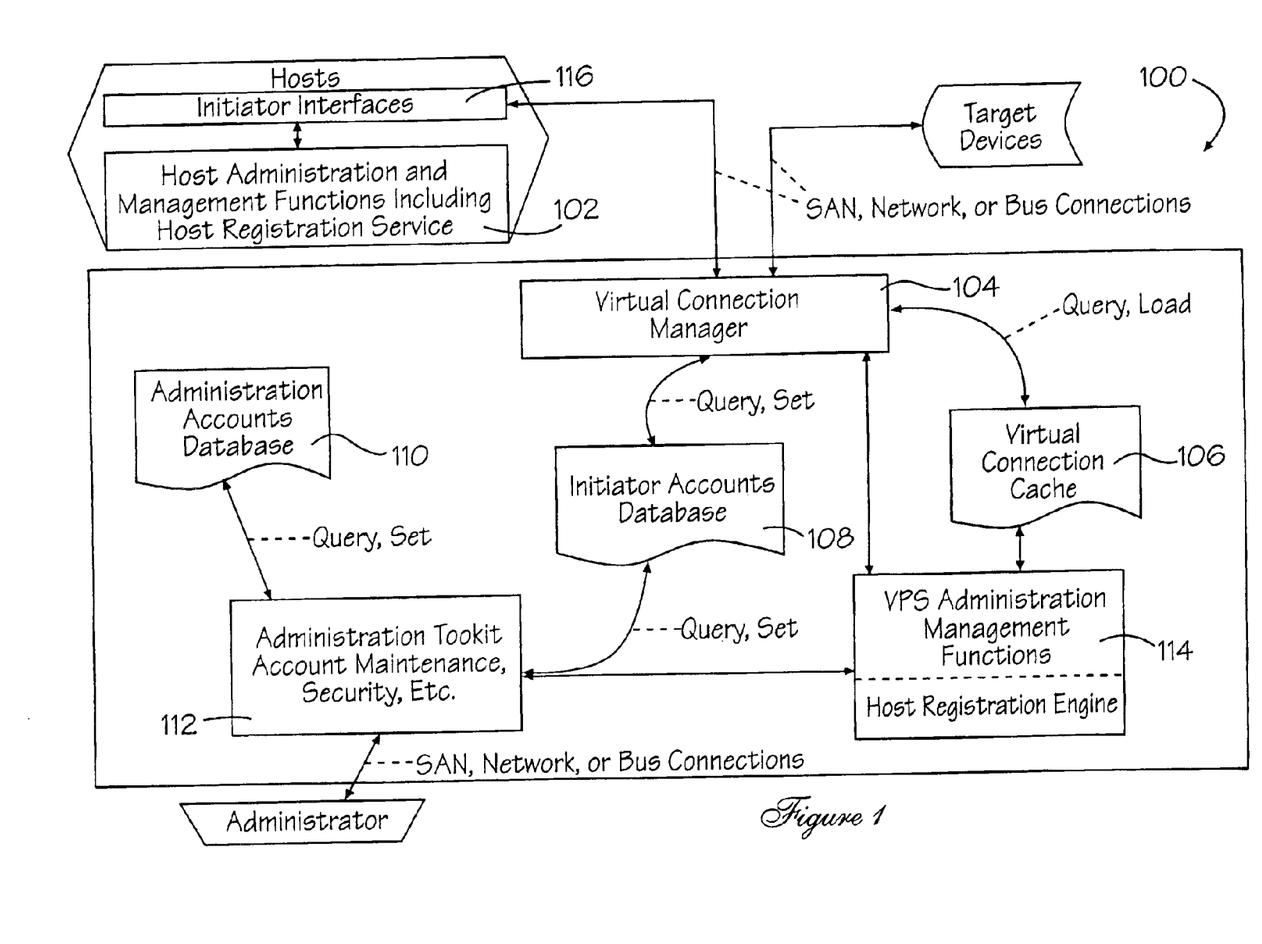
FIG. 1 is a high-level schematic block diagram of the VPS architecture of the invention.

Referring first to FIG. 1, there is shown a high-level system block diagram of the inventive VPS architecture, generally at reference number 100. This VPS platform contains several components including: host administration and management functions 102, a virtual connection manager 104, A virtual connection cache 106, an initiator accounts data base 108, an administrative accounts data base 110, an administration tool kit 112 that provides user interface functions, and VPS administrative management functions 114. Each of these components will be described in detail hereinbelow.

Host administration and management functions 102 include a host registration service (HRS) as well as other administrative and management host services provided on an as-needed basis. These services include provisions for handling functions such as security, statistic gathering, data encryption, data compression, etc.

The HRS issues three registration/de-registration commands which are interpreted within the VPS platform: the full registration command, the periodic registration command, and the de-registration command. For each host initiator interface 116, the HRS packages the configuration information into a standard full registration VPS command and sends the command to each connected VPS platform. This is typically done only once when the host registration service is started. The service may also be run manually to send a full registration command at any time.

If the registration service is enabled for the periodic function, it will schedule itself to run once during each designated registration interval. The default interval is 15 minutes, but the administrator may change this if desired. During each interval the service constructs a periodic registration command which contains only the period value itself. It sends the periodic registration command to the VPS platform. This command is used by the VPS platform to maintain an accurate record of the online state of each registered host initiator interface 116. When the HRS is terminated or receives a shutdown indication from the operating system, it sends a de-registration command to the VPS platform. This informs the platform that the designated interface is going to be shut down shortly.

The HRS is also able to display configuration information for all of the devices visible at each of the host initiator interfaces 116.

The initiator accounts data base 108 creates and maintains a persistent account for each host initiator interface 116 that sends a command to a VPS platform. These accounts contain: I/O access permissions, initiator interface registration information, and initiator interface specific configuration parameters.

Figure 2:
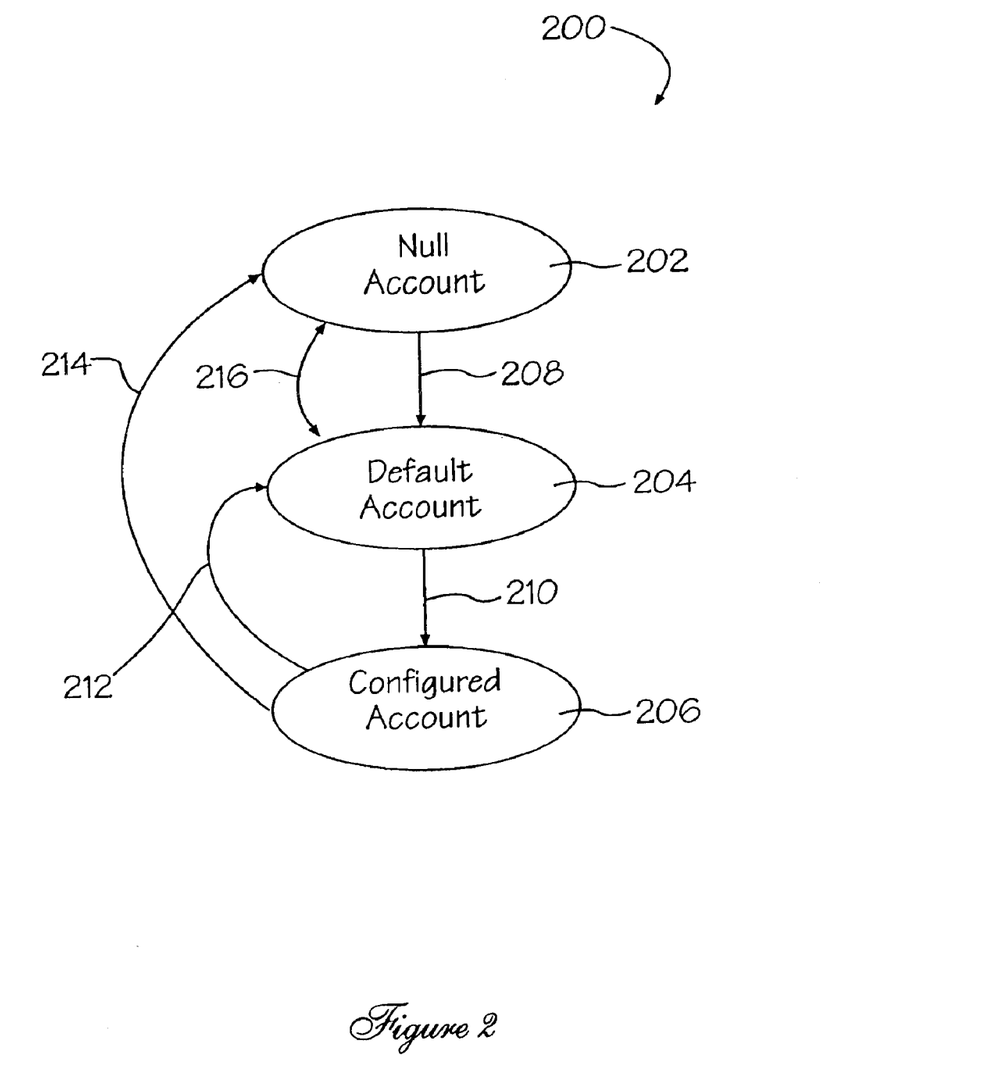
FIG. 2 is a state diagram of an initiator account.

Referring now also to FIG. 2, there is shown a state diagram of an account in the initiator account data base 108, generally at reference number 200. If an initiator has never been connected to a VPS platform, there is no persistent account in the initiator account database. This is referred to as a null state 202. When a host initiator is attached to a VPS platform, the host issues an exploratory command 208. When this exploratory command 208 reaches the VPS platform, a default account is created in the initiator account database and that account enters the Default state, 204 for that initiator. This default account contains only the initiator information that is available to the system at the time the account is created. Access to the command and control logical unit number (LUN) of the VPS platform is the only access allowed to a host initiator while its account is in the default state. Access to I/O target devices is not permitted. A Report LUNs command issued by an initiator with a default account will reflect access to the command and control LUN only. Either administrative action or the automatic VPS enabling process 210 described in more detail hereinbelow is required to add I/O access permissions to the account. This moves the account to the configured access state 206. In this state, the account is said to be configured. This means that the associated host initiator has been given access to all of the target devices that it is intended to interact with. At this point a Report LUNs issued through the corresponding initiator will reflect access to all of LUNs for which permission is configured.

Administrative action 212 returns the account to default access state and removes access permissions to all LUNs but the command and control LUN. Administrative action deleting the account 214 and 216 returns the account to the null account state. Any further administrative actions that change these permissions do not alter the state of the account.

The creation and caching of a virtual connection for every I/O path provides the basis of trusted end-to-end access control without the performance degradation that would be incurred without this feature. This is one of the most significant advantages of the instant invention. A virtual connection is the connection between a specific initiator and a specific logical or physical target LUN or device. A virtual connection may be in one of three states: null state, valid state, and invalid state.

Figure 3:
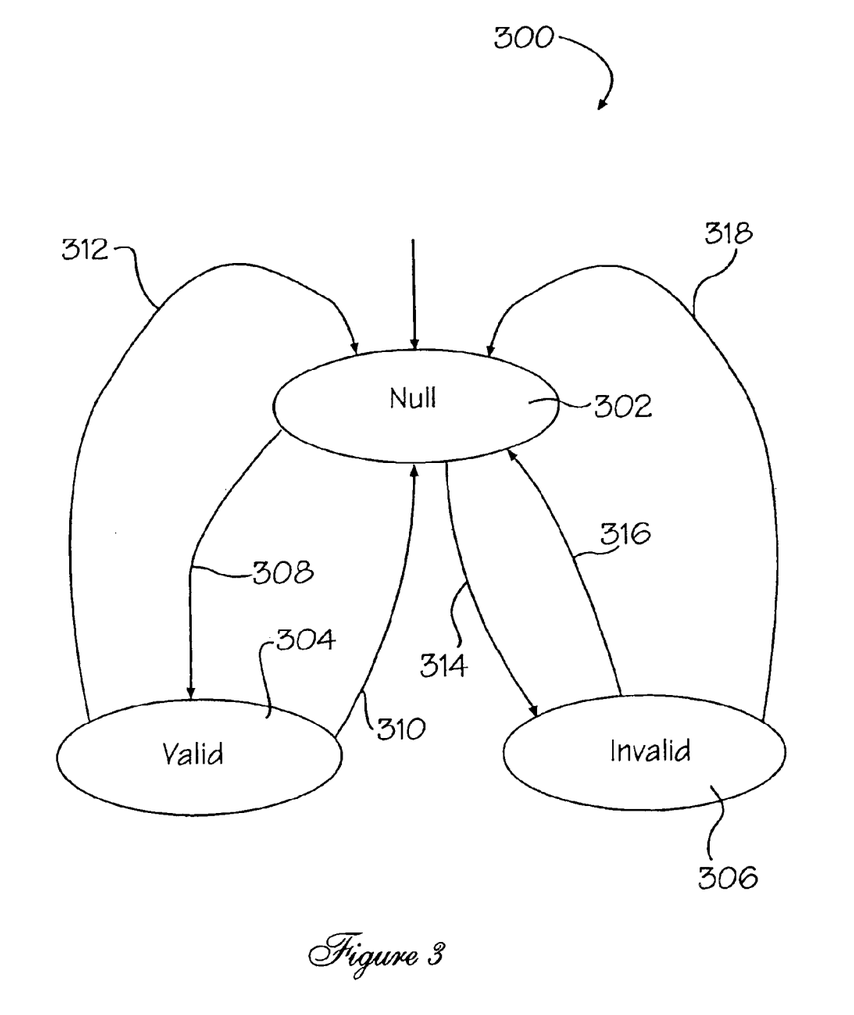
FIG. 3 is a state diagram of a virtual connection.

Referring now to FIG. 3, there is a state diagram 300 showing the relationships of these three states. Any nonexistent connection is said to be in null state 302. This indicates that no I/O requests have been sent from the associated host initiator to the specific logical or physical target device since the VPS platform was initialized.

A connection is created and put in the valid state 304 when an I/O request is received from a specific host initiator to a specific target device for which the initiator account holds access permissions 308. A valid connection may return to the null state 302 either if the logical link over which the request was made is lost 310, or if an administrative action results in a change of permissions 312. A connection is created and put in the invalid state 306 when an I/O request is received from a specific host initiator to a specific target device for which the initiator account does not hold access permissions 314. An invalid connection may be returned to null state 302 if either the logical link over which the request was made is lost 316 or if an administrative action results in a change of permissions 318.

Figure 4:
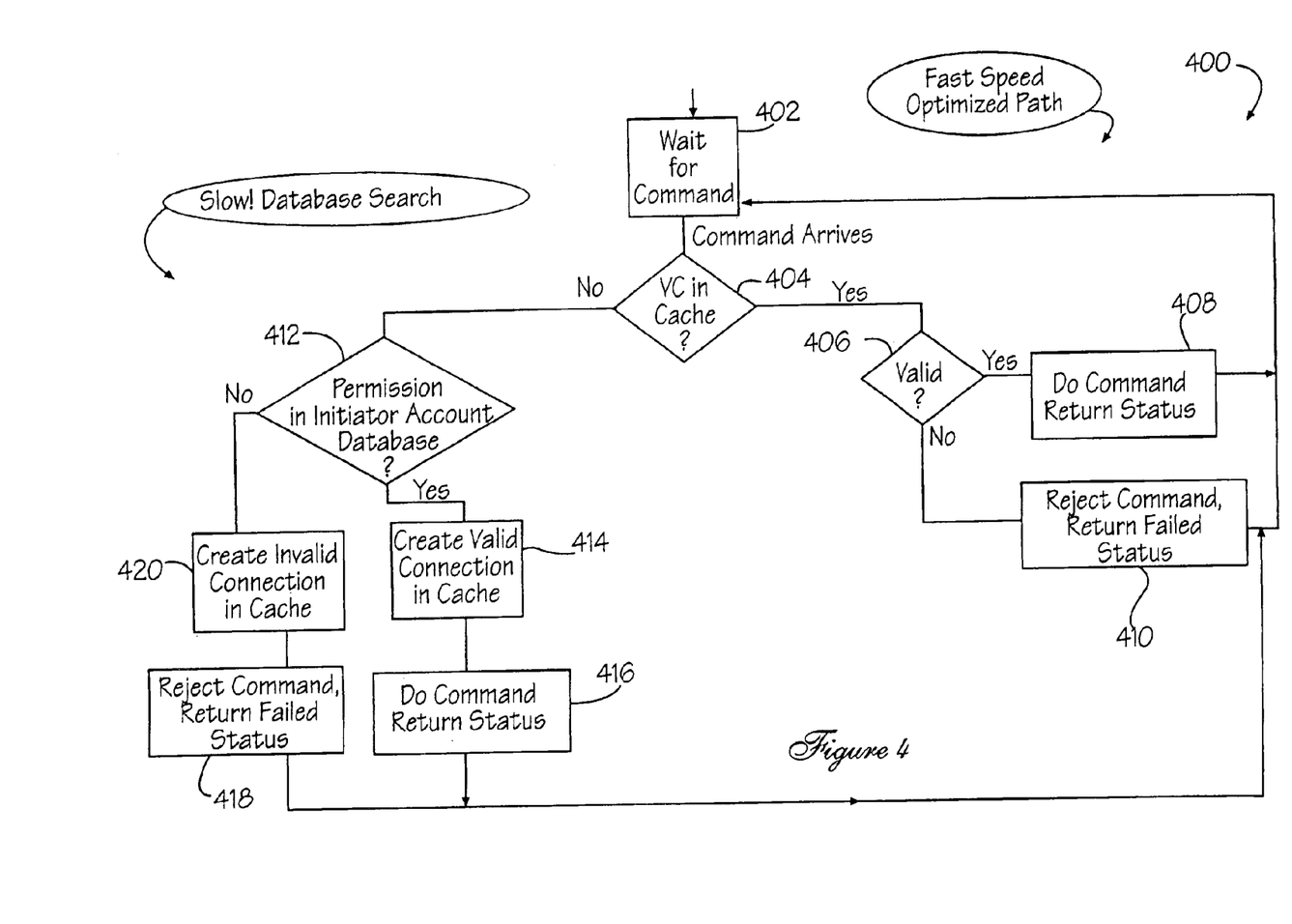
FIG. 4 is a flow chart illustrating the operation of the virtual connection manager.

Referring now to FIG. 4, there is shown a flow chart illustrating the operation of the virtual connection manager 104, generally at reference number 400. Virtual connection manager 104 creates and maintains a virtual connection object in the virtual connection cache for each I/O path that is exercised through the VPS platform. Virtual connection manager 104 waits for a command from a host initiator 116, block 402. When a command arrives, virtual connection manager 104 queries the virtual connection cache 106 to determine whether a connection already exists for the requested I/O path, block 404.

If this connection exists, the virtual connection manager 104 examines the connection to determine whether it is valid, block 406. If the connection is valid, the command is executed and the completion status is returned to the initiator, block 408. If, however, the command is invalid, the command is rejected and a failed status is returned to the initiator, block 410.

Referring again to block 404, if no connection exists in the virtual connection cache 106, virtual connection manager 106 queries the initiator account database 108 to determine whether the initiator holds the necessary permissions block 412. If the necessary permissions are found in the initiator accounts database 108, then a valid connection is created in the virtual connection cache 106 and the command is executed, and completion status returned to the initiator block 416. If, however, permissions are not found for the connection in the initiator accounts database, then an invalid connection is created in the virtual connection cache 106, block 420, the command is rejected, and failed status is returned to the initiator, block 418.

The steps illustrated in FIG. 4 as well as those illustrated in FIG. 3 the virtual connection state diagram show how the inventive architecture is able to enforce complete end-to-end access control with no performance degradation. This is one of the most significant advantages realized by the instant invention. It should be obvious that the maintenance of the virtual connection cache 106 renders it unnecessary to query the account initiator database each time an I/O request arrives from the host initiator. Further more, the architecture allows initiators not running the inventive registration software to function at full speed, although the difficulty of configuring the access for these initiators is increased, due to the degree of manual intervention required to correctly identify them.

The VPS administration management functions include three features. First, the VPS full host registration engine is run within the administrative maintenance functions. The host initiator health status and the VPS automatic access configuration capture features also are run by the VPS administration management functions.

The VPS platform receives a full registration command from the host registration service. The associated initiator account is updated with the information contained in the command. This information includes: hosts name (i.e., the name by which this host is identified on the network); host operating system (OS) type (i.e., the name of the operating system running on the host); the host version; the host network address (i.e., the address by which this host is addressed on the network); host connection identification (i.e., the means by which this initiator is identified on the host); the host initiator type; a unique host initiator identification (i.e., a means by which this host initiator is uniquely identified to the SAN in general and to the VPS platform specifically; it depends upon the link protocol used to attach this initiator to the VPS platform.); any other information pertinent to the operation or administration of the host in general or of this specific host initiator; and periodic registration field (i.e., the time interval for the periodic registration).

Full host registration constitutes one of the most significant functions of the inventive architecture. Before an administrator may configure a network, it is necessary that all devices attached thereto be correctly identified and configured. While the VPS of the instant invention does not require the use of full registration, its enablement completely automates the process of discovering and identifying all initiators connected to the same. This greatly simplifies the process of configuring the SAN and also removes the possibility of problems due to incorrect or out of date configuration information being entered into or retained by the system.

Another significant feature of the inventive architecture is a health monitoring capability that maintains a representation of the current status of all initiators represented in the initiator accounts database. This feature is the host initiator health status monitor. A simple static, two-state monitor exists by default for all initiators. A dynamic, multi-state monitor becomes active when the host registration service is running on an attached host computer.

Figure 5:
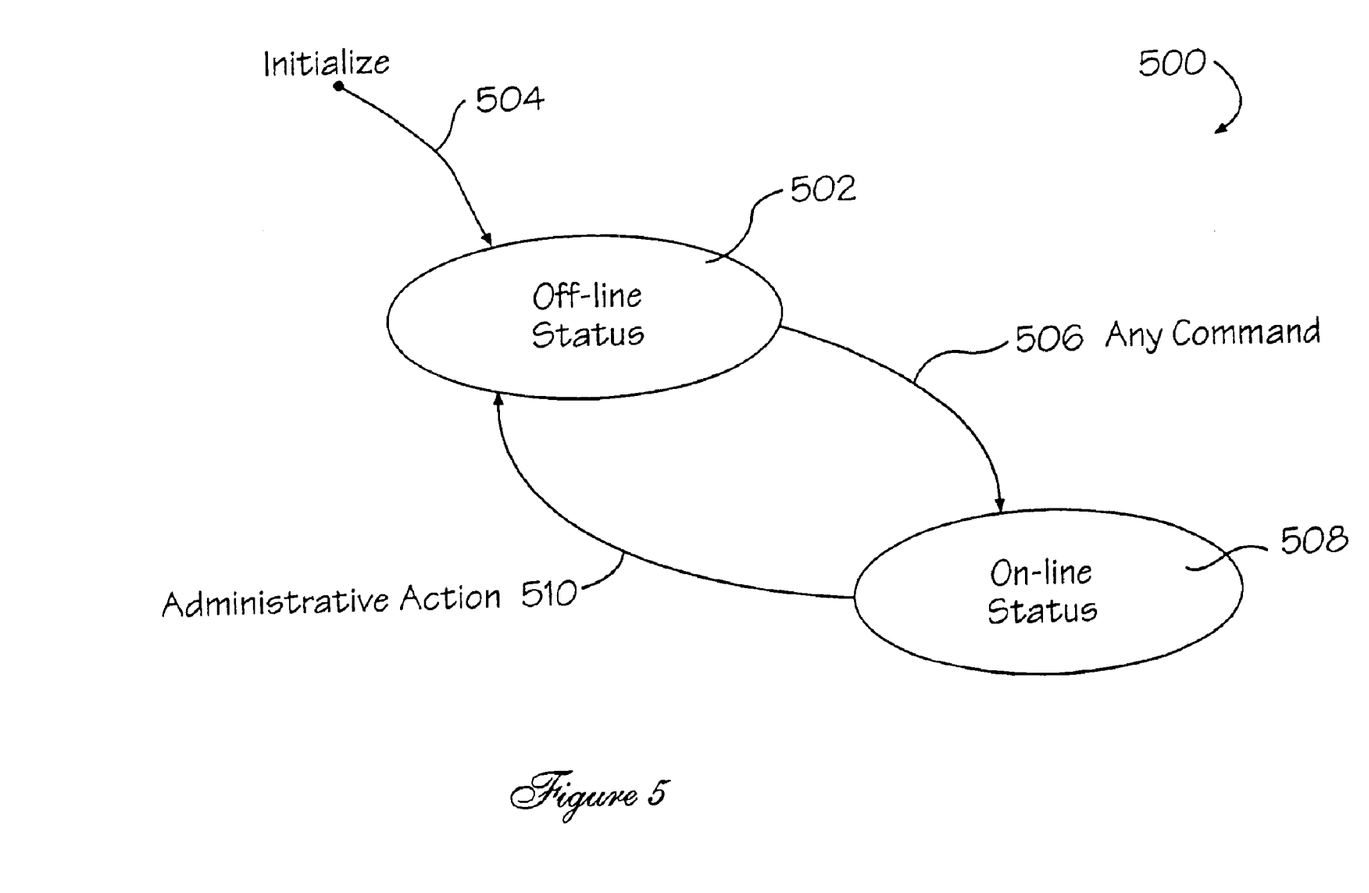
FIG. 5 is a state diagram of the static health monitor.

Referring now to FIG. 5, there is shown a state diagram illustrating the static health monitor, generally at reference number 500. All initiators are placed in the off line status 502 as a result of system initialization 504. Any command 506 issued from an initiator through the VPS platform causes the initiator to move to online status 508. Online status 508 indicates that the associated initiator has sent at least one command to or through the VPS platform since the initiator was offline. A specific initiator may be returned to offline status 502 as a result of an administrative action 510.

Figure 6:
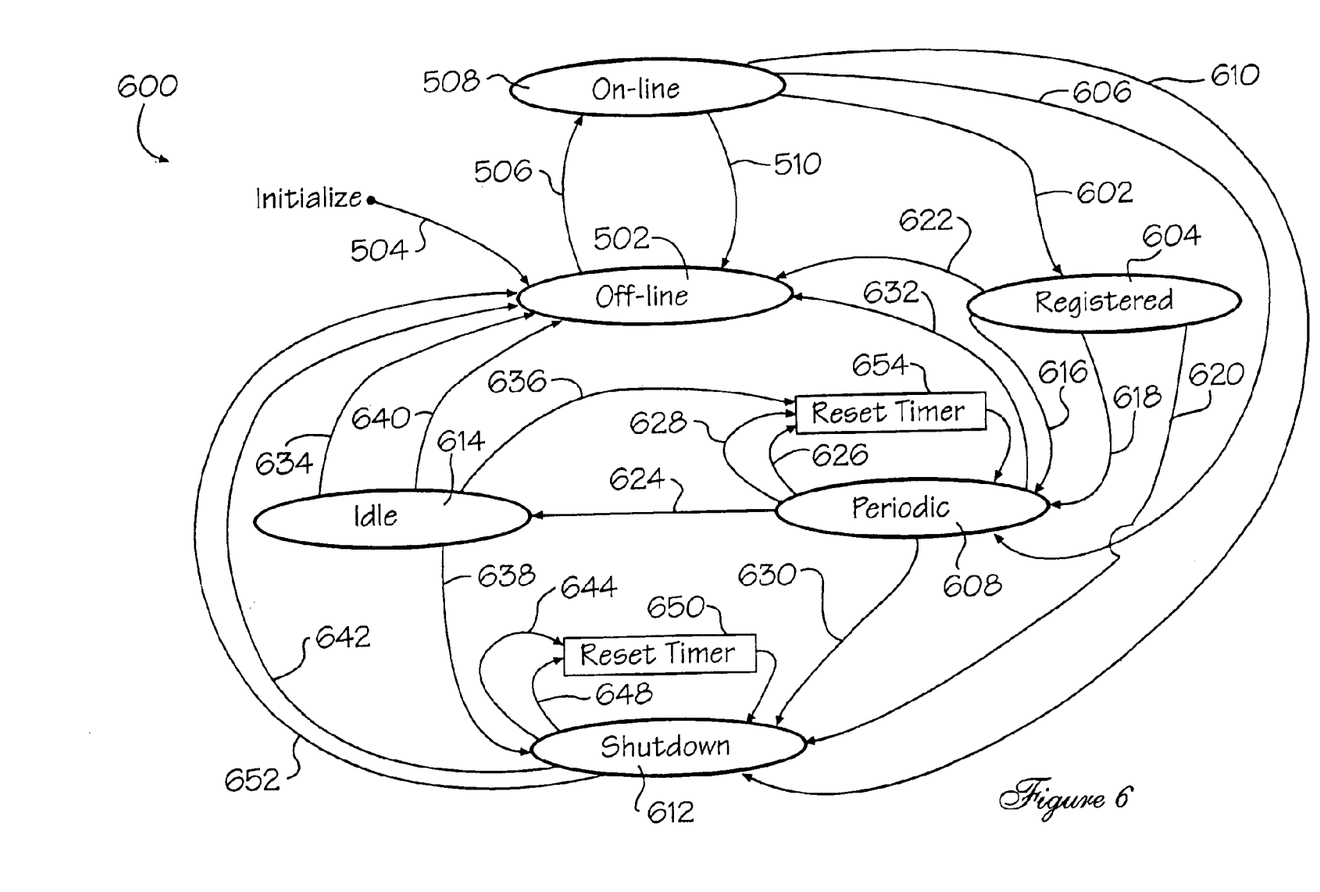
FIG. 6 is a state diagram of the dynamic health status monitoring system of the invention.

Referring now to FIG. 6, there is shown a state diagram of the dynamic health status monitoring system, generally at reference number 600. The use of the dynamic monitor represents a significant improvement over the static monitor illustrated in FIG. 5 because it keeps track of the current status associated with each participating initiator and provides the administrator with the current status of all attached interfaces. It will be noted that offline status 502, online status 508, administrative actions 510, commands 506, and initialization 504 appear identically in the dynamic health status state machine as in the two-status state machine illustrated in FIG. 5.

The dynamic health monitor status values have the following meanings: If a status is online, the initiator has issued I/O commands but has not registered. This is the state of an active initiator running on a host that does not support the VPS host registration service of the present invention.

Registered status indicates that an initiator has issued a full registration command with a health period of zero and, therefore, has not activated periodic registration. This is typical of a situation where the registration is run manually but is not installed on the host as an active service. The initiator remains in this state until either the VPS platform is reinitialized or another registration command is received.

Periodic status indicates that the initiator has sent a full registration command with a health period greater than zero and has activated periodic registration. The initiator remains in this state as long as a periodic or full registration command is received once within every health period.

Idle status indicates that the initiator was in periodic mode but a full or periodic registration command was not received within the allotted time (i.e., the health period). This is normally indicative of an initiator that has been disconnected from the VPS platform.

Shutdown status indicates the initiator has issued a de-registration command. The initiator remains in this state until one period expires without another registration command being received by the registration engine.

Offline status indicates no command has been issued by this initiator since the VPS platform was last initialized; or the registration period has expired while the initiator was in the idle or shutdown state; or the initiator was taken offline by administrative action.

All initiators are placed in the offline status 502 as the result of system initialization 504. Any command issued 506 from an initiator through the VPS platform causes the initiator to move to an online status 508. Online status indicates that the associated initiator has sent at least one command to or through the VPS platform since the initiator was offline 502. The status of online also indicates that no registration command has been received from this initiator since its status was indicated as offline 502. The issuance of a full registration command 602 causes the status to become registered 604.

A periodic registration command 606 moves the status to periodic 608. A de-registration command 610 moves the status to shutdown 612. A specific initiator may be returned from online status 508 to offline status 502 by an administrative action 510.

Registered status 604 indicates that the associated host initiator at some time has sent a full registration command 602 to the VPS platform. This is also true for all of the subsequent dynamic status conditions that may occur following registered status namely, periodic 608, idle 614, and shutdown 612. If the health period is greater than zero 616, then periodic registration 608 is enabled and the initiator is placed in periodic status 608. In addition, the issuance by the host of the periodic registration command 618 also places the initiator in periodic status 608. A de-registration command 620 places the initiator in shutdown status 612. Administrative action 622 may place the initiator in offline status 502.

Periodic status 608 indicates that the VPS host registration service is running on the host in which this initiator is installed. While the initiator is in periodic status, the dynamic health monitor expects to receive a periodic registration command 606 once during every registration period. If the periodic timer for this initiator expires 624, the initiator is placed in idle status 614. The receipt of either a full registration command 626 or a periodic registration command 628 resets the periodic timer 654 for this initiator and does not change the status. A de-registration command 630 places the host in shutdown status 612. An administrative action 632 may place the initiator in offline status 502.

When an initiator is in idle status 614, this indicates that one health period has expired without the issuance of either a full registration, a periodic registration or a de-registration command. If the periodic timer for this initiator expires 634, the initiator is placed in offline status 502. This means that two health periods have expired, the first moving the initiator from periodic status 608 to idle status 614, the second moving the initiator from idle status 614 to offline status 502. The second health period provides a grace period to compensate for the possibility of slow response within the VPS network. A full registration or periodic registration command 636 resets the periodic timer for this initiator and places the initiator back in periodic status 608. A de-registration command 638 moves the initiator to shutdown status 612. Administrative action 640 moves the initiator from idle status 614 to offline status 502.

Shutdown status 612 indicates that the host has announced its intention to shut down this interface. This is done by issuing a de-registration command 610, 620, 630, 638. A de-registration command moves the initiator to shutdown status 612 regardless of its prior status. If the periodic timer for this initiator expires 642, the initiator is placed in offline status 502. The receipt of either a full registration command 644 or a periodic registration command 648 resets timer 650 and does not change the status. The initiator may be moved from shutdown status 612 to offline status 502 by administrative action 652.

Figure 7:
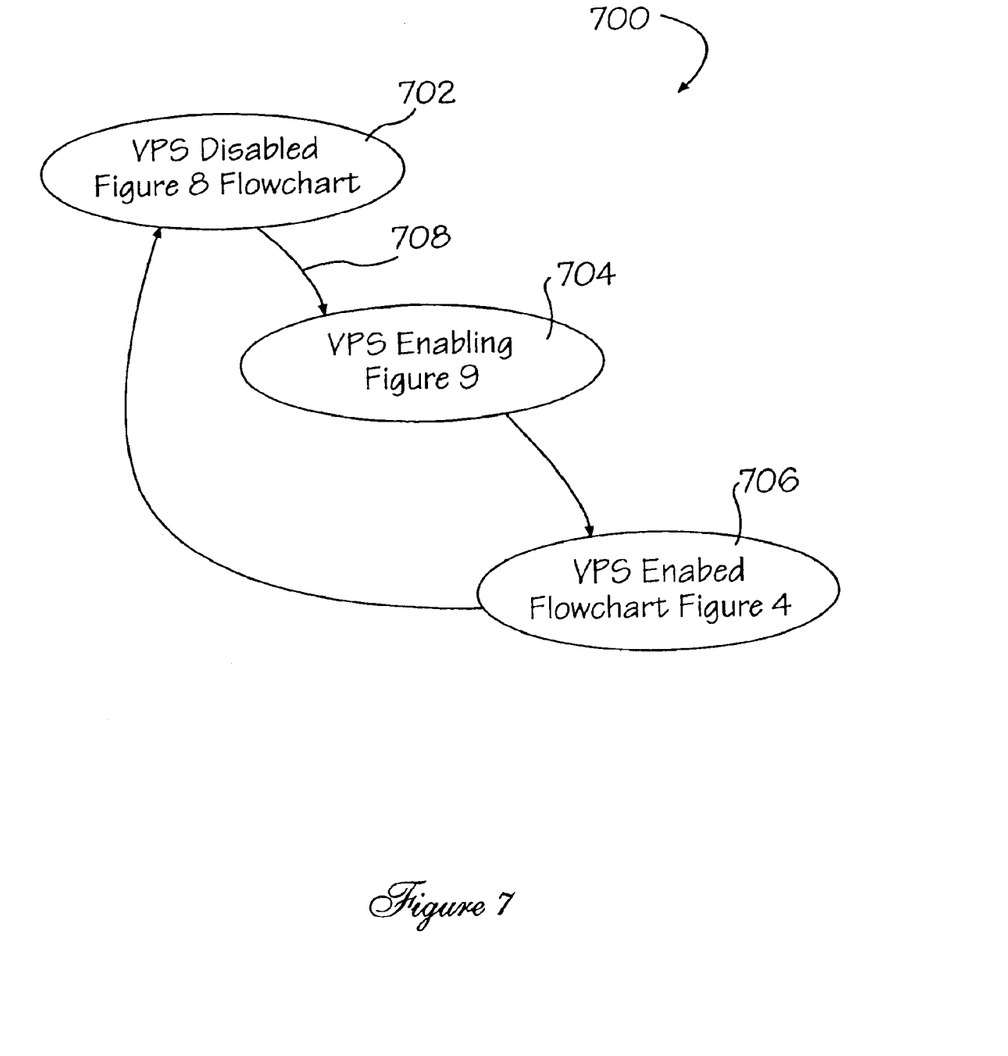
FIG. 7 is a generalized state diagram of the VPS.

Referring now to FIG. 7, there is shown a generalized state diagram of the VPS state machine, generally at reference number 700. Generally speaking, the VPS state machine may exist in one of three states: disabled 702, enabling 704, or enabled 706. When in the enabled state 706, the operation of the system is in accordance with the flow chart of FIG. 4.

Figure 8:
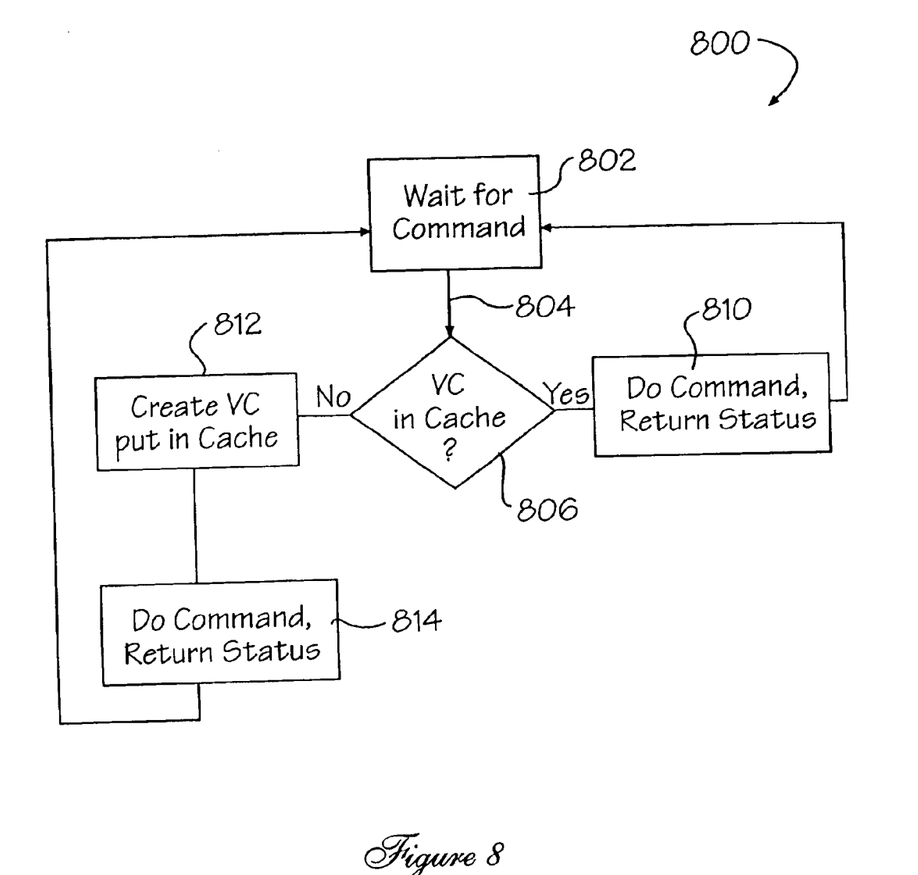
FIG. 8 is a flow chart of VPS operation in a disabled state.

Referring now also to FIG. 8, there is shown a flow chart of the VPS operation in disabled state 702, generally at reference number 800. While in disabled state 702, the VPS is operating in the manner of a prior art SAN. In this state, the VPS capabilities are dormant and the virtual connection manager processes I/O as shown in FIG. 8. The VPS platform first waits for an I/O request, block 802. When a command is received 804, the virtual connection manager 104 queries the virtual connection cache 106 to determine if the connection exists, block 806. If the connection exists, the command is executed and completion status is returned, block 810. If the connection does not exist, the connection is created in the virtual connection cache 106, block 812, the request is executed block 814, and status is returned. Because VPS is operating in disabled state 702, no permission checks are performed; the connections are created blindly.

An administrative action 708 is required to move the VPS from disabled state 702 to an enabling state 704. A prerequisite to this action is that the administrator ensures that no new initiators are added to the SAN during the enabling process 708.

Figure 9:
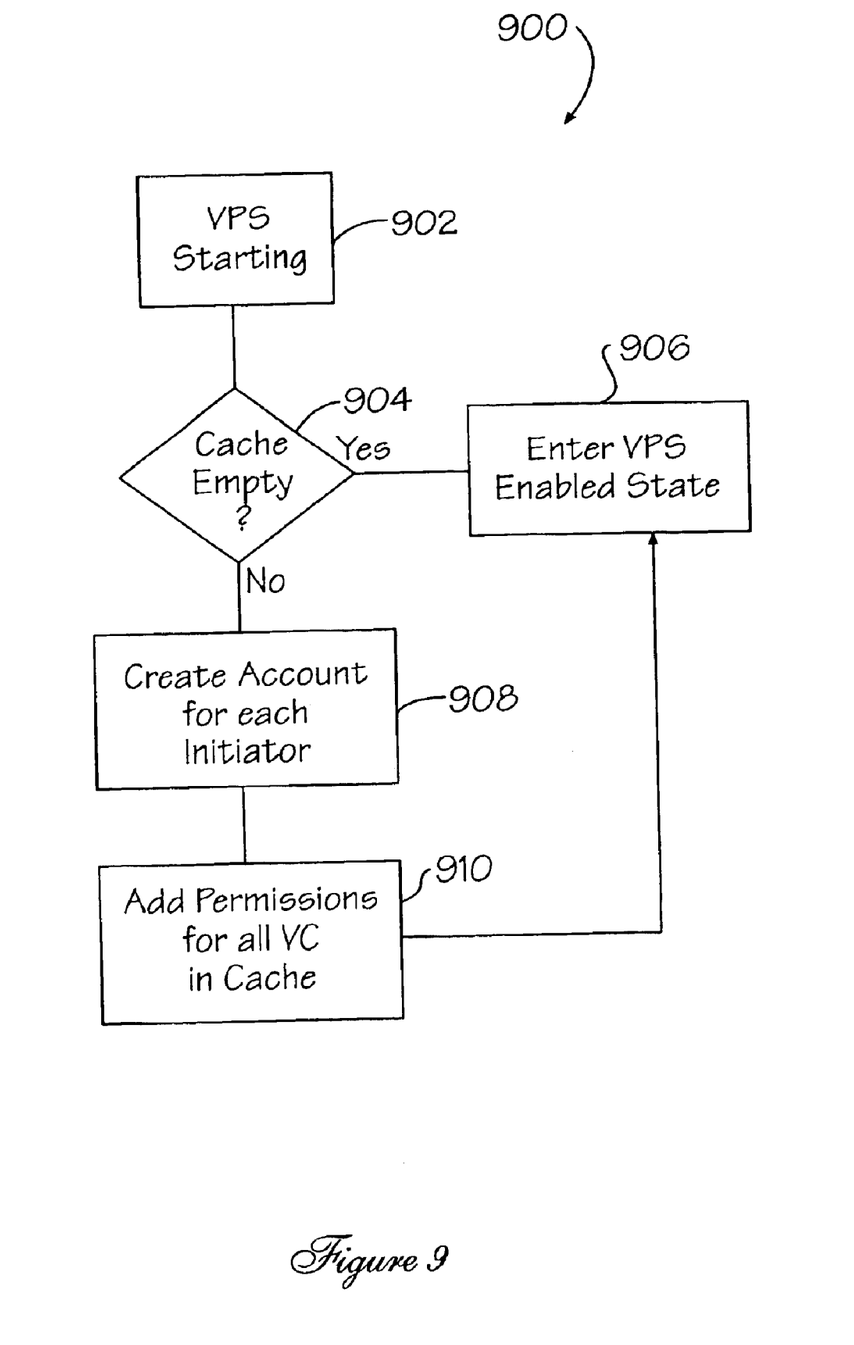
FIG. 9 is a flow chart of the VPS enabling process.

Referring now to FIG. 9, there is shown a flow chart of the enabling process, generally at reference number 900. The VPS enabling process is started by an administrative action 902. The enabling process tests to determine whether the virtual connection cache 106 is empty, block 904. If the virtual connection cache 106 is empty when VPS is enabled, block 906, then no initiator accounts are created during the enabling process and VPS passes directly to the enabled state 706. VPS is now enabled and all subsequent initiator accounts are first created in the default state 204 (FIG. 2), requiring an administrative action 210 to pass into the configured account state. If, however, the virtual connection cache 106 is not empty, then the enabling process creates an account in the default state 204 (FIG. 2) for each host initiator that has one or more connections in the virtual connection cache 106, block 908. Finally, permissions for each connection in the virtual connection cache is entered into the corresponding accounts, block 910. This is equivalent to the administrative action 210 and the accounts thus created are automatically put into the configured state 206.

The administrative tool kit 112 (FIG. 1) provides administrative and user interface functions in one of three forms, over the available interfaces: SCSI commands over the in-band SAN interfaces or over the out-of-band network interface; service port commands over the serial I/O control interface; and control methods such as SNMP MIBs over the out-of-band network interface or over the SAN interface using Fibre Channel IP protocol methods. Several functions are provided via one or more of these interfaces. The host initiator interface list may be displayed, for example. The host initiator properties may be either displayed or set. The host initiator access configuration likewise may be either displayed or set. The administrative access privileges may also be displayed or set. These interfaces provide for manual configuration through the service port or through SAN management platforms such as Pathlights SAN DIRECTOR software. The in band interface allows dynamic SAN configuration functions to be incorporated into third-party software products easily.

The administrative accounts database 110 (FIG. 1) creates and maintains a persistent account for each known administrator. This process is accomplished in conjunction with the administrative tool kit 112. Accounts in the administration accounts database 110 are used to validate the administrative commands submitted through the administrative tool kit.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for creating virtual private connections between end points in a shared storage area network (SAN), the method comprising:
   providing a virtual connection architecture for a host initiator operatively connected thereto, the virtual connection architecture having a virtual connection manager and a virtual connection cache, the virtual connection cache having a list of existing and previously established virtual connections, wherein an existing virtual connection is indicated between a specific host initiator and a specific target storage device, or a specific logical portion thereof, to provide a one-to-one relationship between a host initiator and a target storage device, or a logical portion thereof, for each virtual connection in the virtual connection cache, the host initiator generating and transmitting I/O commands to the virtual connection manager of the virtual connection architecture;
   determining from the virtual connection cache whether a previously established virtual connection exists between the source and destination; and
   when the previously established virtual connection does not exist in the virtual connection cache, then comparing, by the virtual connection manager, source and destination information from the I/O commands to a predetermined list of allowable connections; and
   when the source and destination information matches the predetermined list of allowable connections,
      creating a data connection between the host initiator and the storage device, or a logical portion thereof, operatively connected to the virtual connection architecture, thereby establishing a virtual private SAN; but
   when the virtual connection exists, using a virtual private SAN indicated by the previously established virtual connection in the virtual connection cache without again determining whether the data connection between the host initiator and the storage device indicated by the destination information is allowable.

2. The method for creating virtual private connections between end points in a shared SAN as recited in claim 1, wherein multiple virtual private SANs function independently and substantially simultaneously within the shared SAN.

3. The method for creating virtual private connections between end points in a shared SAN as recited in claim 2, wherein multiple host initiators share a common physical data channel.

4. The method for creating virtual private connections between end points in a shared SAN as recited in claim 3, wherein the multiple host initiators are provided a protected end-to-end data path.

5. The method for creating virtual private connections between end points in a shared SAN as recited in claim 2, wherein the multiple, virtual private SANs support at least one SAN connectivity product from the group: hubs, switches, gateways and routers.

6. The method for creating virtual private connections between end points in a shared SAN as recited in claim 2, wherein the comparing comprises determining a level of access permission for said host initiator.

7. The method for creating virtual private connections between end points in a shared SAN as recited in claim 6 further comprising storing information representative of at least one of the allowable connections.

8. The method for creating virtual private connections between end points in a shared SAN as recited in claim 7, wherein the storing comprises storing the information in a virtual connection cache.

9. The method for creating virtual private connections between end points in a shared SAN as recited in claim 8 further comprising using the information stored in the virtual connection cache to validate subsequent requests for access from the host initiator.

10. The method for creating virtual private connections between end points in a shared SAN as recited in claim 2, wherein the multiple virtual private SANs are operable within an existing SAN without need for additional software, middleware, drivers, or modifications to an existing operating system.

11. The method for creating virtual private connections between end points in a shared SAN as recited in claim 2, wherein the virtual private connections are fully secured independently of the security of each individual host.

12. The method for creating virtual private connections between end points in a shared SAN as recited in claim 2, wherein the multiple virtual private SANs operate independently of attached storage devices.

13. The method for creating virtual private connections between end points in a shared SAN as recited in claim 12, wherein the attached storage devices comprise any mixture of legacy or new technology storage devices.

14. The method for creating virtual private connections between end points in a shared SAN as recited in claim 2, wherein the multiple virtual private SANs operate independently of connection interfaces and provide support for at least one from the group of interfaces: Fibre Channel, SCSI, other SAN interfaces.

15. The method for creating virtual private connections between end points in a shared SAN as recited in claim 2, wherein the host initiator comprises a host initiator interface for providing a connection to the virtual connection architecture.

16. The method for creating virtual private connections between end points in a shared SAN as recited in claim 6 further comprising providing a registration engine for receiving a registration command from the host initiator.

17. The method for creating virtual private connections between end points in a shared SAN as recited in claim 16, wherein the registration command comprises at least one of the commands from the group: full registration, periodic registration, and de-registration commands.

18. The method for creating virtual private connections between end points in a shared SAN as recited in claim 17, wherein the registration engine comprises a host registration service operating on the host initiator.

19. The method for creating virtual private connections between end points in a shared SAN as recited in claim 17, wherein the registration command comprises host and initiator specific information for facilitating automatic identification and configuration of the host and interface.

20. The method for creating virtual private connections between end points in a shared SAN as recited in claim 16 further comprising periodically monitoring a health status of the host initiator.

21. The method for creating virtual private connections between end points in a shared SAN as recited in claim 20 further comprising the issuance of a periodic registration command.

22. The method for creating virtual private connections between end points in a shared SAN as recited in claim 8 further comprising automatically capturing an existing SAN configuration and using the captured configuration information to automatically establish persistent access controls.

23. An apparatus for creating virtual private connections between end points in a shared storage area network comprising:

means for establishing a virtual connection between a source and a destination, wherein the means for establishing the virtual connection includes a virtual connection manager and a virtual connection cache, the virtual connection cache having a list of existing and previously established virtual connections, wherein an existing virtual connection is indicated between a specific host initiator and a specific target storage device, or a specific logical portion thereof, to provide a one-to-one relationship between a host initiator and a target storage device, or a logical portion thereof, for each virtual connection in the virtual connection cache;

means for receiving I/O commands containing source and destination information;

means for determining whether a previously established connection exists;

means for using a previously established connection when it exists without determining whether the previously established connection is allowable:

means for comparing the source and destination information in the I/O commands to a predetermined list of allowable data connections when a previously established connection does not exist;

means for creating a virtual private storage area network connection between the source and destination when the data connection is allowable but does not exist; and means for using the virtual private storage area network.

24. The apparatus of claim 23 wherein when a virtual private storage area network connection is created, storing an indication of the connection in the virtual connection cache.

25. The apparatus of claim 23 wherein the means for creating a virtual private storage area network connection includes means for determining whether the data connection exists by reading an indication from the virtual connection cache.

26. A method for creating virtual private connections between end points in a shared storage area network (SAN), the method comprising:

providing a virtual connection architecture for a host initiator operatively connected thereto, the virtual connection architecture having a virtual connection manager and a virtual connection cache, the host initiator generating and transmitting I/O commands to the virtual connection manager of the virtual connection architecture; the virtual connection cache having a list of existing and previously established virtual connections, wherein an existing virtual connection between a specific host initiator and a specific target storage device or a specific logical portion thereof provides a one-to-one relationship between the host initiator and the target storage device or the logical portion thereof, thereby allowing the virtual connection manager to execute a received I/O command immediately without further qualification using the virtual private connection indicated by the previously established virtual connection in the virtual connection cache; and in the absence of a previously established virtual connection in the virtual connection cache;

comparing, by the virtual connection manager, source and destination information from the I/O commands to a predetermined list of allowable connections; and when the source and destination information matches the predetermined list of allowable connections;

creating a virtual connection in the virtual connection cache between the host initiator and a storage device, or a logical portion thereof, operatively connected to the virtual connection architecture, thereby establishing a virtual private SAN; and the virtual connection now existing, using the virtual private SAN indicated by the established virtual connection.

* * * * *